(12) United States Patent
Woo et al.

(10) Patent No.: US 8,852,516 B2
(45) Date of Patent: Oct. 7, 2014

(54) METHOD AND APPARATUS FOR THE CONTINUOUS SEPARATION AND DISCHARGE OF SOLID CATALYSTS AND PRODUCTS FOR FISCHER-TROPSCH SYNTHESIS REACTIONS

(75) Inventors: Kwang Jae Woo, Daejeon (KR); Ki-won Jun, Daejeon (KR); Suk-Hwan Kang, Daejeon (KR); Seung-Moon Kim, Daejeon (KR); Jong-Wook Bae, Daejeon (KR)

(73) Assignees: Korea Research Institute of Chemical Technology, Daejeon (KR); Daelim Industrial Co., Ltd., Seoul (KR); Korea National Oil Corporation, Gyeonggi-do (KR); Hyundai Engineering Co., Ltd., Seoul (KR); SK Innovation Co., Ltd., Seoul (KR); Korea Gas Corporation, Gyeonggi-do (KR)

( * ) Notice: Subject to any disclaimer, the term of this patent is extended or adjusted under 35 U.S.C. 154(b) by 378 days.

(21) Appl. No.: 12/919,919

(22) PCT Filed: Dec. 8, 2008

(86) PCT No.: PCT/KR2008/007250
§ 371 (c)(1),
(2), (4) Date: Aug. 27, 2010

(87) PCT Pub. No.: WO2009/107927
PCT Pub. Date: Sep. 3, 2009

(65) Prior Publication Data
US 2011/0028574 A1 Feb. 3, 2011

(30) Foreign Application Priority Data
Feb. 29, 2008 (KR) .......... 10-2008-0018679

(51) Int. Cl.
| | |
|---|---|
| *B01J 8/20* | (2006.01) |
| *B01J 8/22* | (2006.01) |
| *B01J 4/00* | (2006.01) |
| *C10G 2/00* | (2006.01) |
| *B01J 8/00* | (2006.01) |
| *B01J 8/18* | (2006.01) |

(52) U.S. Cl.
CPC . *B01J 8/22* (2013.01); *C10G 2/342* (2013.01); *B01J 2208/00061* (2013.01); *C10G 2300/4081* (2013.01); *B01J 2219/00236* (2013.01); *B01J 8/006* (2013.01); *C10G 2300/4056* (2013.01); *B01J 2208/0061* (2013.01); *B01J 2208/0007* (2013.01); *B01J 2219/002* (2013.01); *B01J 8/1809* (2013.01); *B01J 2219/00213* (2013.01)
USPC .......... 422/105; 422/106; 422/110; 422/112; 422/140; 422/147

(58) Field of Classification Search
None
See application file for complete search history.

(56) References Cited

U.S. PATENT DOCUMENTS

| | | | | |
|---|---|---|---|---|
| 3,542,674 | A | * | 11/1970 | Machlan ................. 210/709 |
| 4,276,181 | A | * | 6/1981 | Cordier et al. ........... 210/741 |
| 4,478,707 | A | * | 10/1984 | Bischoff et al. .......... 208/157 |
| 4,487,065 | A | * | 12/1984 | Carlin et al. ............. 73/290 V |
| 4,550,012 | A | * | 10/1985 | Penick .................... 422/106 |
| 4,580,597 | A | * | 4/1986 | Cordingley et al. ...... 137/561 A |
| 5,422,375 | A | | 6/1995 | Rytter et al. |
| 5,543,437 | A | | 8/1996 | Benham et al. |
| 5,599,849 | A | | 2/1997 | Jager et al. |
| 5,620,607 | A | * | 4/1997 | Bowie, Jr. ................ 210/702 |
| 5,939,350 | A | | 8/1999 | Singleton et al. |
| 6,096,789 | A | | 8/2000 | Clerici et al. |
| 7,098,251 | B2 | | 8/2006 | Clerici et al. |
| 7,144,924 | B2 | | 12/2006 | Clerici et al. |

FOREIGN PATENT DOCUMENTS

| | | |
|---|---|---|
| EP | 0 221 209 A | 5/1987 |
| JP | 2002-510246 A | 4/2002 |
| JP | 2006-289264 A | 10/2006 |
| WO | WO 2005/090521 A | 9/2005 |

OTHER PUBLICATIONS

American Sensor Technologies. AST5400—Filtration Applications, Wet/Wet Differential Pressure Sensor. 2011. <http://www.artsensensors.com/files/pdf/differential_pressure_sensor_filtration.pdf>. Retrieved from web on Feb. 1, 2013.*

* cited by examiner

*Primary Examiner* — Jennifer A Leung
(74) *Attorney, Agent, or Firm* — Frommer Lawrence & Haug LLP; Ronald R. Santucci

(57) ABSTRACT

The present invention relates to a continuous separation and discharge apparatus and method of solid catalysts and liquid products for Fischer-Tropsch synthesis reactions, and more particularly, to a continuous separation and discharge apparatus and method of solid catalysts and products for Fischer-Tropsch synthesis reactions involving the conversion of synthetic gas into synthetic oil, by which products of the Fischer-Tropsch synthesis including wax, as a long-chain hydrocarbon, can be stably obtained by continuously separating the products from a slurry comprising solid catalyst particles and the products using periodic pulses of a feeding gas and discharging the products through a lower portion of a reactor. Provided is a continuous separation and discharge apparatus of solid catalysts and products for Fischer-Tropsch synthesis reactions including: a level sensing device which is installed at an upper portion of a reactor and detects the slurry-level of reactants; a solid catalyst/product separation device and a discharge device which are installed at a lower portion of the reactor and separate and discharge liquid products from a mixed slurry in the reactor; and a control unit which receives a signal from the level sensing device to open and close the discharge device, wherein the separation device filters the solid catalysts, and the discharge device continuously discharges the products separated from the solid catalysts through the lower portion of the reactor by the amount of the synthesized products measured by a level sensing device.

6 Claims, 7 Drawing Sheets a b

Example 1 (Gas-Pulse Performed)

Comparative Example 1 (Gas-Pulse Not Performed)

METHOD AND APPARATUS FOR THE CONTINUOUS SEPARATION AND DISCHARGE OF SOLID CATALYSTS AND PRODUCTS FOR FISCHER-TROPSCH SYNTHESIS REACTIONS

This application is a 371 of PCT/KR2008/007250 filed on Dec. 8, 2008 published on Sep. 3, 2009 under publication number WO 2009/107927 A which claims priority benefits to Korean Patent Application Number 10-2008-0018679 filed Feb. 29, 2008, the disclosure of which is incorporated herein by reference.

TECHNICAL FIELD

The present invention relates to an apparatus and method for continuous separation and discharge of liquid products and solid catalysts for Fischer-Tropsch synthesis reactions, and more particularly, to a continuous separation and discharge apparatus and method of solid catalysts and liquid products for Fischer-Tropsch synthesis reactions involving the conversion of synthetic gas into synthetic oil, by which products of the Fischer-Tropsch synthesis including wax, as a long-chain hydrocarbon, can be stably obtained by continuously separating the products from a slurry comprising solid catalyst particles and the products using periodic pulses of a feeding gas and discharging the liquid products through a lower portion of a reactor.

BACKGROUND ART

Recently, with the recent rapid increase in oil price, much attention has been paid to gas to liquid (GTL) processes using natural gases instead of petroleum as fuels for transportation or raw materials in the petrochemical industry. In fact, the researches on Fischer-Tropsch synthesis, a carbon monoxide hydrogenation, had not been active until early 1970s, but with the recent increase in oil price, Fischer-Tropsch method is gaining again much attention.

Of the techniques involved in the GTL process, which have various techniques including those for reforming and purifying synthetic gases, the Fischer-Tropsch synthesis reaction, by which synthetic hydrocarbon is synthesized from a synthetic gas, is considered a core technique.

Various products may be synthesized according to the composition of synthetic gas and a catalyst used in the Fischer-Tropsch synthesis process to produce synthetic oil from synthetic gas ($CO+H_2$).

In general, if a synthetic gas having a $H_2/CO$ ratio of 2 or higher is used for the Fischer-Tropsch synthesis process, a large amount of heavy hydrocarbon products is synthesized. On the other hand, if synthetic gas having a $H_2/CO$ ratio of less than 2 is used for the Fischer-Tropsch synthesis process, gasoline ($C_5$-$C_{11}$), diesel ($C_{12}$-$C_{18}$), wax ($>C_{24}$), or the like are synthesized.

Fe-based and Co-based Fischer-Tropsch catalysts are used in an industrial scale according to the $H_2/CO$ ratio.

Further, various chemical products such as hydrocarbon, alcohol, ether, and acetic acid can be synthesized by varying synthetic conditions.

U.S. Pat. No. 5,543,437A (Charles B. Benham, Arvada) and WO 2005/090521 (CompactGTL plc, Mike Bowe, Joseph) disclose a process for the production of long-chain hydrocarbons, such as synthetic oil, from natural gas.

In general, reactors for Fischer-Tropsch synthesis can be classified into fixed bed reactors (FBR), slurry bubble column reactors (SBCR), and fuidized bed reactors. At present, the fixed bed reactors and the slurry bubble column reactors are widely used.

The slurry bubble column reactor is more advantageous than the fixed bed reactor as a pilot-scale reactor for Fischer-Tropsch synthesis as follows.

The slurry bubble column reactor:
1) has high efficiency of heat transfer,
2) has no pressure drop and no temperature gradient along an axial direction of the reactor (i.e., no hot spot),
3) can add, discharge, and restore a catalyst during the operation,
4) can be easily installed,
5) can be installed in a cost-effective manner,
6) has high yield (the amount of products per reactor volume), and
7) has a large capacity of reactor.

Based on these advantages, slurry bubble column reactors are more widely used than the fixed bed reactors. However, slurry bubble column reactors require a slurry recirculation device and a separator which separates solid catalysts and liquid products from the slurry.

In addition, since catalyst particles in the slurry bubble column reactor are attrited to finer particles with a lapse of time during the operation, efficiencies of the slurry recirculation device and the separation device are decreased so that the catalyst particles may be discharged out of the slurry bubble column reactor. Thus, products cannot be uniformly and continuously obtained since the concentration of the slurry and operation conditions in the slurry bubble column reactor are changed.

U.S. Pat. No. 5,599,849A (Berend Jager) discloses a back flush process upon the slurry separator in a slurry bubble column reactor for Fischer-Tropsch synthesis. Liquid products are continuously separated and discharged using a plurality of filtering medium units, as a slurry separation device, installed at an upper portion of the slurry bubble column reactor. When a pressure drop of equal to or greater than 8 bar is detected in the slurry separation device, the slurry separation device is restored to an initial state using a back flush of liquid products and high pressure gases.

However, according to the above patent, pressure loss applied to the slurry separation device is increased with a lapse of time during the operation. Accordingly, pressure in the reactor is increased to increase the level of reactants, and thus the concentration of the slurry is decreased. Theses change in operation conditions cannot induce a uniform Fischer-Tropsch synthesis reaction. Furthermore, the products and the high pressure gases, which are media of the back flush process, further increase the pressure in the reactor, thereby interfering with regular operations.

Further, a short-chain hydrocarbon instead of the desired long-chain hydrocarbon may be obtained since the separation device and the product discharge device are disposed at an upper portion of the reactor since the desired products of the Fischer-Tropsch reaction may be positioned at the lower portion of the reactor due to increased viscosity and specific gravity with the growth of the chain.

U.S. Pat. No. 5,422,375A (Erling Rytter) discloses a method of continuously separating and discharging slurry in a reactor for Fischer-Tropsch synthesis by installing a slurry separation device for pressure fluctuations in the reactor and sensing a vacuum state in the slurry separation device when the level of reactants is increased.

However, the method is not practical, and has a disadvantage that the separation device cannot be easily repaired once it becomes defective.

U.S. Pat. No. 7,144,924 B2 (Gabriele Carlo Ettore Clerici) discloses a hydro-cyclone for separating slurry. The efficiency of the hydro-cyclone is significantly influenced by the concentration of the slurry and catalyst particle size distribution.

Unfortunately, however, since catalyst particles in the slurry bubble column reactor are abraded with a lapse of time during the operation, the hydro-cyclone may not be practical.

Thus, there is a need to develop a Fischer-Tropsch synthesis method by which solid catalyst and product mixture slurry is continuously separated and high-quality long-chain hydrocarbon products are uniformly discharged by the amount of the synthesized products in the slurry bubble column reactor for Fischer-Tropsch synthesis.

[Reference No. 1] U.S. Pat. No. 5,543,437 A (Charles B. Benham, Arvada) 1996 Aug. 6

[Reference No. 2] WO 2005/090521 (CompactGTL plc, Mike Bowe, Joseph) 2005 Sep. 29

[Reference No. 3] U.S. Pat. No. 5,599,849 A (Berend Jager) 1997 Feb. 4

[Reference No. 4] U.S. Pat. No. 5,422,375 A (Erling Rytter) 1995 Jun. 6

[Reference No. 5] U.S. Pat. No. 7,144,924 B2 (Gabriele Carlo Ettore Clerici) 2006 Dec. 6

DISCLOSURE

Technical Problem

The present invention provides an apparatus and method for continuous separation and discharge of liquid products and solid catalysts for Fischer-Tropsch synthesis reactions by which long-chain hydrocarbon synthetic oil is continuously synthesized under stable operation conditions by continuously separating solid catalysts and liquid products mixture slurry and uniformly maintaining the concentration of the slurry in a reactor by discharging the products by the amount of the synthesized products.

The present invention also provides an apparatus and method for continuous separation and discharge of solid catalysts and liquid products for Fischer-Tropsch synthesis reactions by which reaction is uniformly maintained by restoring separation efficiency of a slurry separation device to an initial state without changing reaction conditions when a pressure drop is increased in the slurry separation device and separation efficiency is decreased.

Technical Solution

According to an aspect of the present invention, there is provided a continuous separation and discharge apparatus of solid catalysts and liquid products for Fischer-Tropsch synthesis reactions by which synthetic oil is synthesized from a feeding gas, the apparatus including: a level sensing device which is installed at an inner portion of a reactor and detects the level of reactants; a solid catalyst/liquid product separation device and a discharge device which are installed at a lower portion of the reactor and separate and discharge solid catalysts and products mixed in the reactor; and a control unit which receives a signal from the level sensing device to open and close the discharge device, wherein the separation device filters the solid catalysts, and the discharge device continuously discharges the liquid products separated from the solid catalysts through the lower portion of the reactor by the amount of the synthesized products measured by a slurry level sensing device.

The continuous separation and discharge apparatus may further include: differential pressure sensors which are installed at upper and lower portions of the separation device and detect a pressure drop occurring at the upper and lower portions of the separation device; and a filter restoration device which provides periodic gas pulses to the separation device using a feeding gas to restore the separation device, to which the solid catalysts are fused or deposited, back to an initial state, wherein the control unit receives a signal from the differential pressure sensor to control operation of the filter restoration device when the pressure drop is increased to a predetermined level.

The level sensing device may include one of a radar type or ultrasonic wave type level sensor and a thermocouple, or both of the level sensor and the thermocouple, wherein the thermocouple detects the level of reactants by the temperature difference between the slurry-state reactants and space filled with gases.

The separation device may be a filter for separating solid catalysts and products having a uniform pore size.

The separation device may be a planar filter or a cartridge type filter having a relatively larger separation area compared to the planar filter.

The discharge device may include an outlet disposed at a lower portion of the reactor, a product discharge fluid flow control valve, which opens and closes the outlet, and a drive unit controlling the opening and closing operations of the fluid flow control valve, wherein the drive unit is a motor or a cylinder.

The filter restoration device may include a gas distributor having a plurality of nozzles, a gas injection fluid flow control valve supplying the feeding gas to the gas distributor, and a drive unit controlling the opening and closing operations of the gas injection fluid flow control valve, for uniformly injecting the feeding gas into the reactor and not inhibiting the solid catalyst/product mixture from being injected into the separation device, wherein the drive unit is a motor or a cylinder.

The gas distributor may include a tubular cylinder in which a gas flows, wherein a plurality of rows of the tubular cylinder are arranged in parallel or the tubular cylinder radially extends from the center.

According to another aspect of the present invention, there is provided a method of continuously separating and discharging solid catalysts and products for Fischer-Tropsch synthesis reactions, the method including: measuring a level of reactants according to the progress of the reaction using a level sensing device; filtering solid catalysts using a separation device disposed at a lower portion of a reactor and discharging products by opening a product discharge fluid flow control valve disposed at a lower portion of the separation device when the level sensing device detects that the level of reactants reaches a first standard level (high level); and closing the product discharge fluid flow control valve when the level sensing device detects that the level of the reactants reaches a second standard level (low level) as the level of the reactants is decreased by discharging the products using the product discharge fluid flow control valve.

The method may further include a filter restoration comprising: detecting a pressure drop occurring by the increased amount of the solid catalysts fused to and deposited on the separation device as the number of discharge of the product discharge fluid flow control valve is increased, using differential pressure sensors installed at upper and lower portions of the reactor; and removing the deposited solid catalysts by providing a feeding gas to the separation device if a pressure drop is greater than a predetermined level based on a signal received from the differential pressure sensors.

Advantageous Effects

As described above, according to the continuous separation and discharge apparatus and method of solid catalysts and products for Fischer-Tropsch synthesis reactions, products synthesized by the Fischer-Tropsch reaction can be continuously obtained by uniformly maintaining the level of reactants using a level sensing device, and continuously separating and discharging the products through a lower portion of a reactor using product separation and discharge devices installed at a lower portion of the reactor.

In addition, a filter for separating the products is restored to an initial state by providing periodic gas pulses thereto so that the products can be continuously prepared for a long period of time using separation, discharge, and periodic restoration processes.

Further, since a hydro-cyclone and a slurry recirculation device, which are essential for a conventional slurry bubble column reactor for Fischer-Tropsch reactions, are not necessary, a Fischer-Tropsch (FT) reactor can be simply manufactured and easily operated, and efficiency decrease of the FT reactor due to the abrasion of catalysts can be inhibited.

<Code explanation of major parts of drawings>

| | |
|---|---|
| 10: a level sensor | 11: thermocouples |
| 12: a slurry bubble column reactor | 15: a slurry-state solid catalyst |
| 16: a control unit | 17: a drive unit for product discharge |
| 18: a product discharge fluid flow control valve | |
| 19: a product buffer tank | 20: electronic differential pressure sensors |
| 21: a drive unit for gas injection | 22: gas injection fluid flow control valve |
| 23: a gas distributor | 24: solid catalyst/product mixture and metal sintering filter |
| 25: a cartridge type filter | 26: metal seal |
| 27: nozzle | |

MODE FOR INVENTION

Hereinafter, the present invention will be described in more detail with reference to the accompanying drawings, in which exemplary embodiments of the invention are shown.

Figure 2:
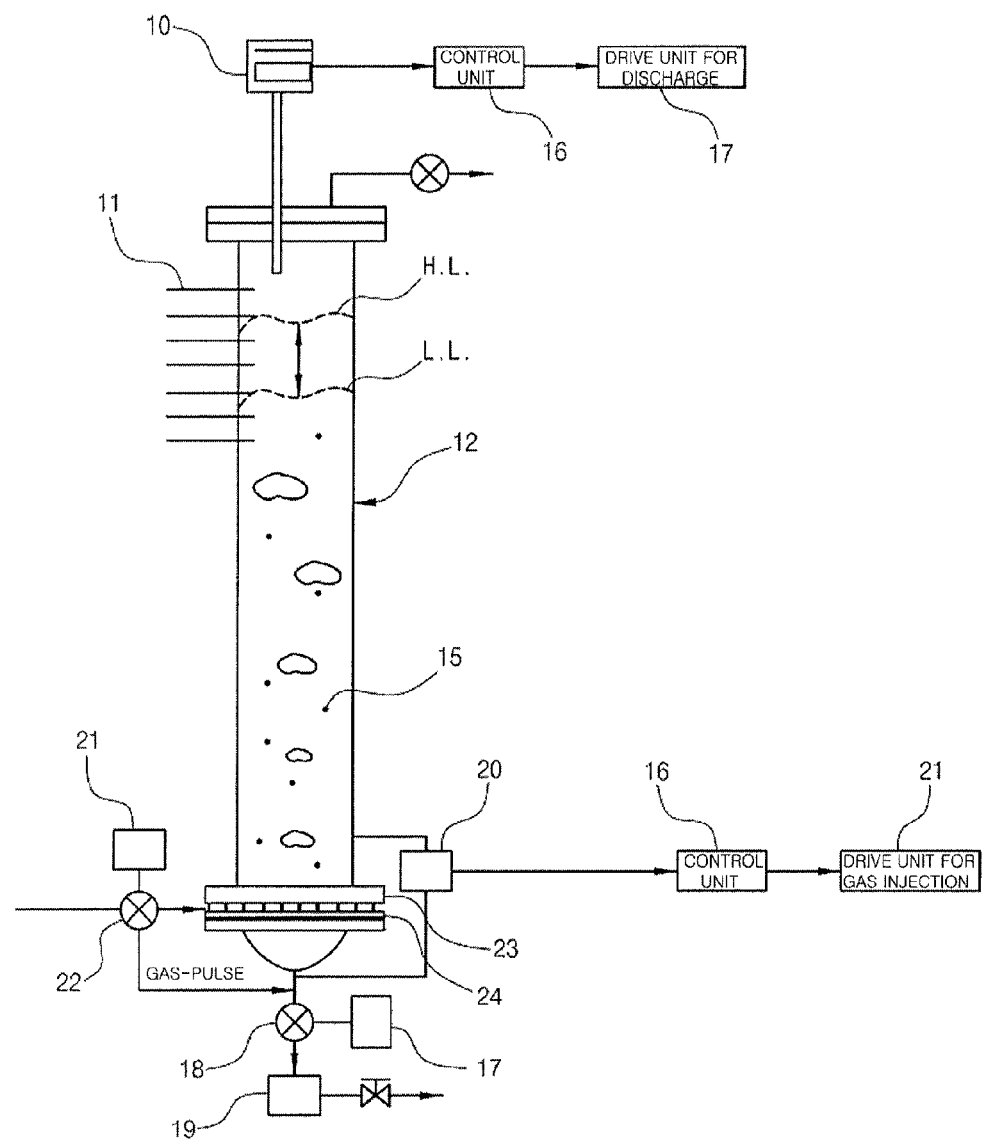
FIG. 2 schematically illustrates a slurry bubble column reactor for Fischer-Tropsch synthesis according to the present invention.

FIG. 2 schematically illustrates a continuous separation and discharge apparatus of solid catalyst and products for Fischer-Tropsch synthesis reactions according to the present invention.

Referring to FIG. 2, a level sensor 10 and thermocouples 11 detecting the level of reactants are disposed at an upper portion of a slurry bubble column reactor 12, and a solid catalyst/product (wax) separation device and a product discharge device are disposed at a lower portion of the slurry bubble column reactor 12.

In general, in the slurry bubble column reactor 12 for Fischer-Tropsch synthesis, a feeding gas including CO and $H_2$ is injected through the lower portion of the slurry bubble column reactor 12. Then, chemical reactions between the feeding gas and the slurry-state solid catalyst 15 are conducted in the slurry bubble column reactor 12 so as to synthesize hydrocarbon such as wax as shown in Formula I below. Since the Fischer-Tropsch synthesis is an exothermic reaction, a cooling device is necessary.

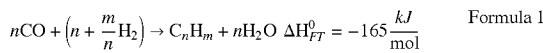

$$nCO + \left(n + \frac{m}{n}H_2\right) \rightarrow C_nH_m + nH_2O \quad \Delta H^0_{FT} = -165 \frac{kJ}{mol} \quad \text{Formula 1}$$

Cobalt (Co)- and iron (Fe)-based catalysts are widely used for the Fischer-Tropsch reaction. Synthetic oil and wax may be synthesized in the presence of a cobalt catalyst at 200 to 260° C. at 1.0 to 3.0 MPa, and diesel and naphtha may be synthesized in the presence of an iron catalyst at 300 to 350° C. at 1.0-3.0 MPa.

The present invention focuses on the synthesis of wax in the presence of the cobalt catalyst. The wax synthesized by the Fischer-Tropsch reaction may be a $C_{12}$-$C_{200}$ hydrocarbon, and preferably a $C_{23}$-$C_{48}$ hydrocarbon, and the number of carbon atoms may be adjusted by regulating operation methods and conditions. An average particle size of the cobalt catalyst used in the Fischer-Tropsch reaction for slurry reaction may be in a range of about 30 to 150 μm.

Figure 1:
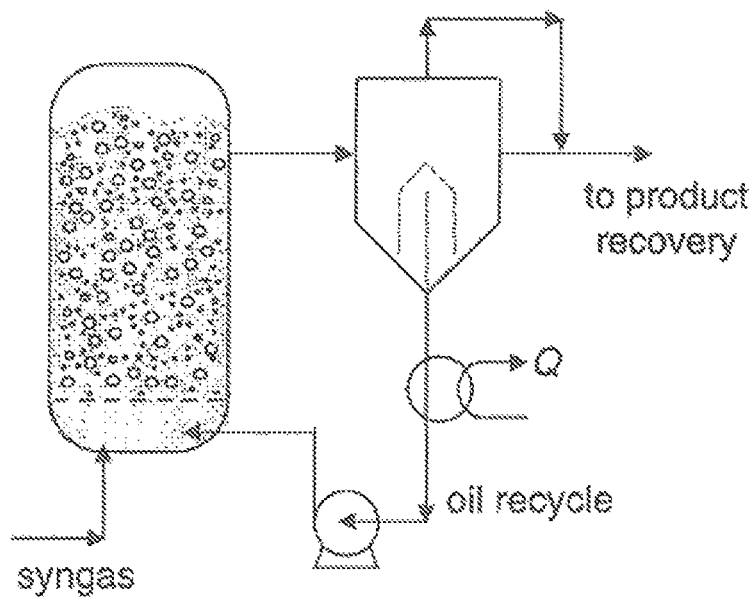
FIG. 1 schematically illustrates a conventional slurry bubble column reactor for Fischer-Tropsch synthesis.

In general, products synthesized by the Fischer-Tropsch reaction are discharged out of a reactor 1 in the form of catalyst/product mixture slurry, and transferred to a separation device 2 to obtain a final product. As shown in FIG. 1, a slurry recirculation device, such as a slurry pump 3, is necessary in order to re-inject the catalyst separated outside of the reactor 1 into the reactor 1.

As shown in U.S. Pat. No. 5,599,849A (Berend Jager), products may be directly discharged out of a reactor 12 using a catalyst/product separation device disposed at an upper portion inside the reactor.

As described above, the products synthesized in a conventional bubble column reactor for the Fischer-Tropsch synthesis are discharged through the upper portion of the reactor. However, wax, the product of the Fischer-Tropsch synthesis, may be located at the lower portion of the reactor since wax having a long hydrocarbon chain has high quality, high viscosity, high specific gravity, and high boiling point.

As shown in FIG. 2, wax having a long hydrocarbon chain which is synthesized by the Fischer-Tropsch reaction may be efficiently obtained according to the present invention since the separation/discharge device is disposed at the lower portion of the slurry bubble column reactor 12.

The level of the slurry-state reactants is increased by the amount of the products synthesized by the Fischer-Tropsch synthesis as the Fischer-Tropsch synthesis progresses in the slurry bubble column reactor 12. The level of the reactants in the slurry bubble column reactor 12 is detected by the level sensor 10 or thermocouples 11 disposed at the upper portion of the slurry bubble column reactor 12. When the level of the reactants reaches a predetermined high level, a drive unit 17 for discharging products, disposed at the lower portion of the slurry bubble column reactor 12, receives a signal from the level sensor and opens a product discharge fluid flow control valve 18 to discharge the products until the level of the reactants reaches a predetermined low level.

In this regard, among the slurry-state reactants, solid catalysts 15 are filtered by a metal sintering filter 24 disposed at the lower portion of the slurry bubble column reactor 12, and liquid products are discharged out of the slurry bubble column reactor 12. When the level of the reactants reaches the low level, the drive unit 17 receives a signal from the level sensor and closes the product discharge fluid flow control valve 18. Thus, the level of the reactants in the slurry bubble column reactor 12 is increased to the high level by the synthesized products.

This process is repeated. Accordingly, the product discharge fluid flow control valve 18 is opened by the signal received from the level sensor 10 or the thermocouples 11 to discharge a predetermined amount of the products out of the slurry bubble column reactor 12. Thus, the level of the reactants in the slurry bubble column reactor 12 and the concentration of the slurry may be constantly maintained to have uniform working conditions, thereby obtaining high purity products.

Radar type or ultrasonic wave type high-temperature and high-pressure level sensors 10 and thermocouples 11 may be used as a level sensing device. While the slurry-phase reactants do not have temperature gradient along the axial direction in a SBCR, the slurry-phase reactants and gas-phase space filled with tail gases have a temperature difference ranging from 10 to 30° C. in the Fischer-Tropsch reaction. Thus, the thermocouples 11 may be used as level sensing devices.

In particular, if the level sensor 10 cannot be installed in a small-sized slurry bubble column reactor 12 or the level sensor 10 has frequent defects, the thermocouples 11 which can transmit output signals may be more efficiently used in the slurry bubble column reactor 12 compared to the level sensor 10.

In addition, a solid catalyst/product separation device may be a metal sintering filter 24 having a pore size of about 5 to about 15 μm and standing high temperature and high pressure. If the pore size of the metal sintering filter 24 is too small, significant pressure drops occur at upper and lower portions of the metal sintering filter 24 to reduce the separation rate of the catalyst and wax. On the other hand, if pore size of the metal sintering filter 24 is too large, finely abraded catalyst cannot be efficiently separated. Thus, metal sintering filter 24 may have a pore size of about 5 to about 15 μm.

During the continuous slurry separation and product discharge, if catalyst particles are fused to or deposited on micro pores of the metal sintering filter 24, as a slurry separation device, and inhibit the products from being smoothly separated and discharged, pressure drops are increased at the upper and lower portions of the metal sintering filter 24.

In order to solve theses problems, electronic differential pressure sensors 20 are installed at the upper and lower portions of the metal sintering filter 24. The pressure drops occurring at the upper or lower portion of the metal sintering filter 24 may be detected by the electronic differential pressure sensors 20 disposed at the upper and lower portions of the metal sintering filter 24. A control unit 16 receives the detected signal and transmits a control signal to a drive unit 21. Then, the drive unit 21 controls a gas injection fluid flow control valve 22.

The product discharge fluid flow control valve 18 is closed by the detected signal so that the products are not discharged. The gas injection fluid flow control valve 22, which is disposed at the side of the slurry bubble column reactor 12, is opened toward a pipe for discharging the products at the lower portion of the slurry bubble column reactor 12. Periodic gas pulses using a feeding gas are provided to the metal sintering filter so that pressure drops increasingly occurring at the upper and lower portions of the metal sintering filter 24 return to an initial state. Accordingly, the continuous slurry separation and product discharge may be restored back to the initial state.

In this regard, the drive units 17 and 21 are devices providing driving forces so as to open and close the fluid flow control valves 18 and 22, and may be configured by a gear and motor assembly or a hydraulic piston and cylinder assembly.

In addition, the gas used for the gas pulse of the metal sintering filter 24 may be a feeding gas of the Fischer-Tropsch reaction. The gas is transferred into the slurry bubble column reactor 12 after being used for the gas pulse and used as the feeding gas of the Fischer-Tropsch reaction.

According to a back-flushing of the metal sintering filter 24 using the feeding gas, conditions for the Fischer-Tropsch reaction are not changed during the back-flushing process.

A product buffer tank 19 may be used in order to smoothly discharge the products since the Fischer-Tropsch synthesis is performed at high temperature and high pressure.

Figure 3:
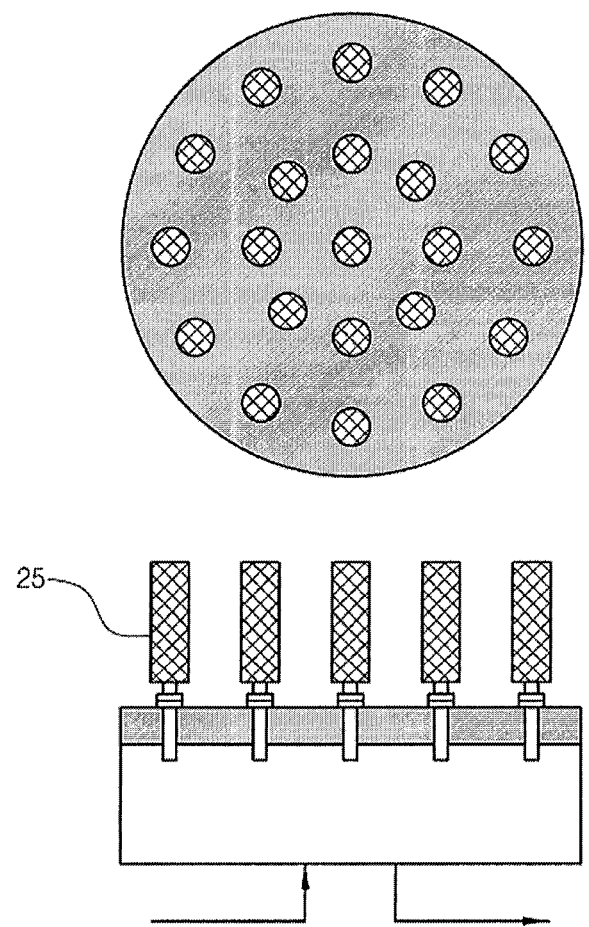
FIG. 3 illustrates a plan view and a front view of a cartridge type solid catalyst/wax separation device.

FIG. 3 illustrates a plan view and a front view of a cartridge type solid catalyst/wax separation device. The metal sintering filter used herein may be a planar filter 24 or a cartridge type filter 25 shown in FIG. 3.

A planar metal sintering filter 24 may be used in a laboratory scale or bench scale slurry bubble column reactor 12, and a cartridge-shape metal sintering filter 25, which has a wide separation area using a plurality of cartridge units, may be used in a pilot scale slurry bubble column reactor 12 or a greater reactor.

Since the cartridge type filter 25 has a wider separation area than the planar filter 24, the solid catalyst/wax separation rate may be increased and the lifetime of the gas injection fluid flow control valve 22 may be prolonged by delaying the cycle of the gas pulse using the cartridge type filter 25.

Figure 4:
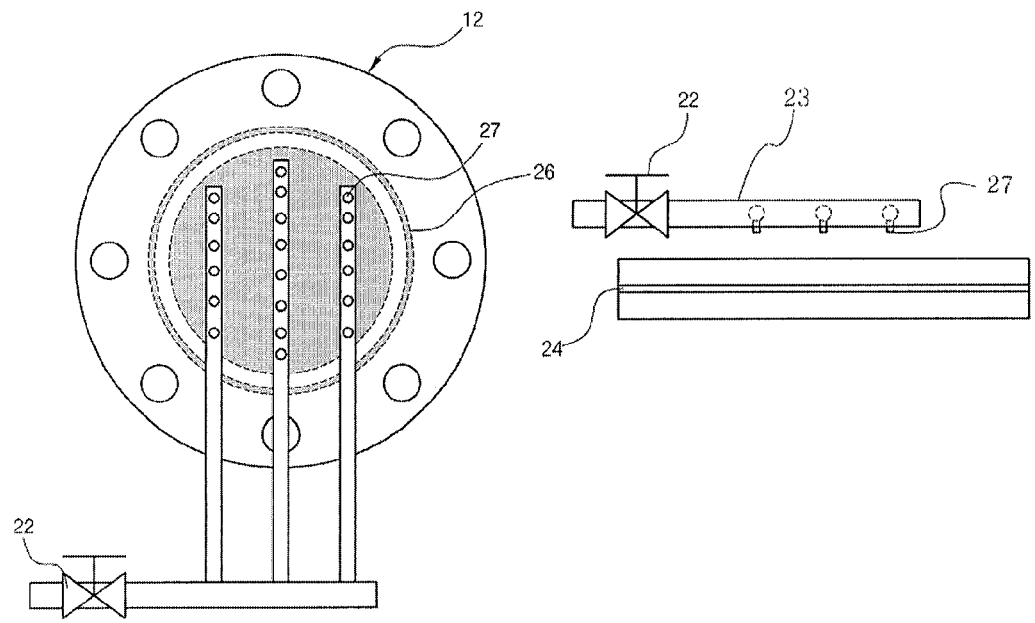
FIGS. 4A and 4B respectively illustrate a plan view and a front view of a gas distributor.
Figure 4:
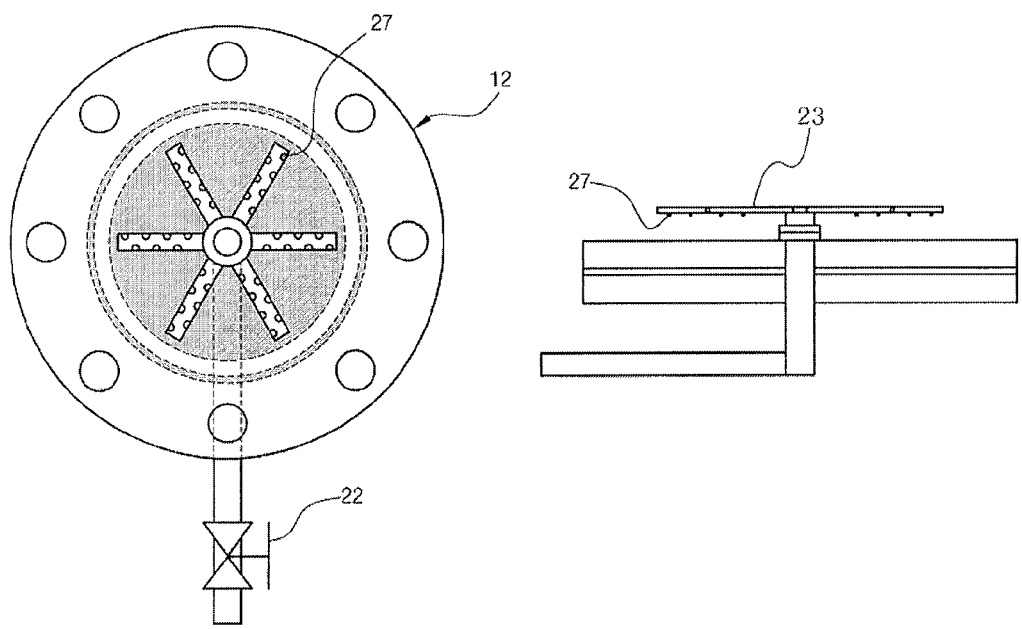

FIGS. 4a and 4b illustrate gas distributors (or spargers) 23. FIG. 4a is a multi-row tube type gas distributor, and FIG. 4b is a spider type gas distributor.

The gas distributor 23 can uniformly inject the feeding gas into the slurry bubble column reactor 12. In addition, the contact between the solid catalyst/product mixture and the metal sintering filter 24 should not be interfered. Thus, a multi-nozzle tube type 27 (FIG. 4a) or multi-nozzle spider type 27 (FIG. 4b) may be preferably used for the gas distributor 23 rather than a perforated plate type having holes with a predetermined size. The gas distributor 23 may be disposed on the metal sintering filter 24.

The present invention will now be described in greater detail with reference to the following examples. The following examples are for illustrative purposes only and are not intended to limit the scope of the invention.

Examples and Comparative Examples

Figure 5:
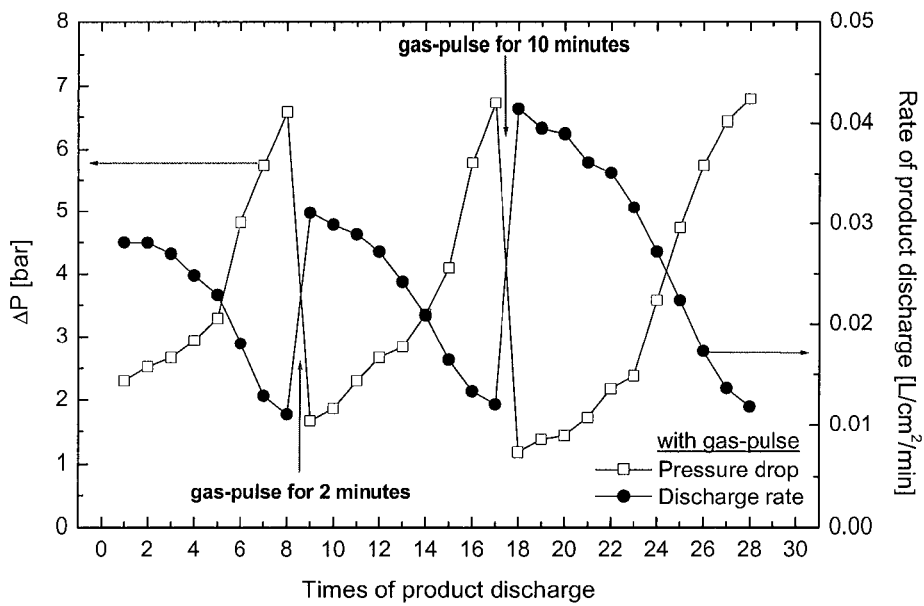
FIG. 5 illustrates pressure drops applied to a separation device and rates of product discharge according to the number of times of product discharge.
Figure 5:
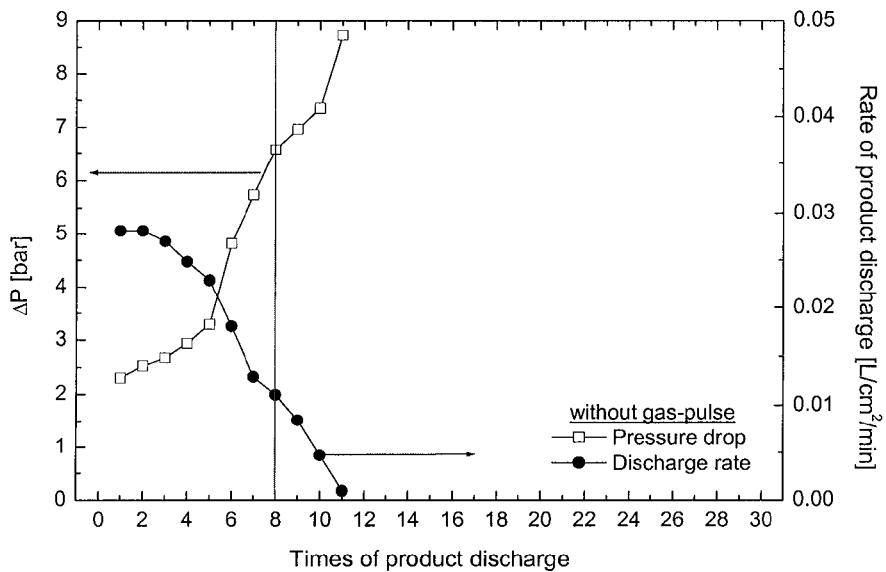

FIG. 5 illustrates pressure drops applied to a metal sintering filter and rates of product (wax) discharge according to the number of times of the solid catalyst/wax separation and discharge, in a Fischer-Tropsch synthesis reactor having a diameter of 0.05 m and a height of 1.5 m (220° C., 20 bar) according to Example 1 and Comparative Example 1.

The pressure drop occurring at the upper and lower portions of the metal sintering filter is increased as the number of times of the solid catalyst/wax separation and discharge is increased as shown in FIG. 5 (Example 1 (gas pulse)). As the pressure drop is increased, the rate of wax discharge is decreased.

When the product discharge is performed 8 times and the rate of wax discharge is about 0.01 l/cm$^2$/min (if a standard is 0.02 l/cm$^2$/min), a gas pulse is provided to the metal sintering filter using the feeding gas.

The pressure drop and the rate of wax discharge return to the initial state by performing the gas pulse for 2 minutes. When the product discharge is further performed 9 times, the pressure drop is increased, thereby decreasing the rate of wax discharge to about 0.01 l/cm$^2$/min. The pressure drop and the rate of wax discharge return to a state more excellent than the initial state by performing the gas pulse for 10 minutes. By repeating the process, the solid catalyst/wax separation device may be operated in optimized conditions.

On the other hand, if the gas pulse is not performed as shown in Comparative Example 1 of FIG. 5, the pressure drop occurring at the upper and lower portions of the metal sintering filter is increased up to 9 bar by a fused catalyst cake when the solid catalyst/wax separation and discharge is performed more than 10 times. Thus, the wax cannot be discharged due to the rapid increase of the pressure drop.

Figure 6:
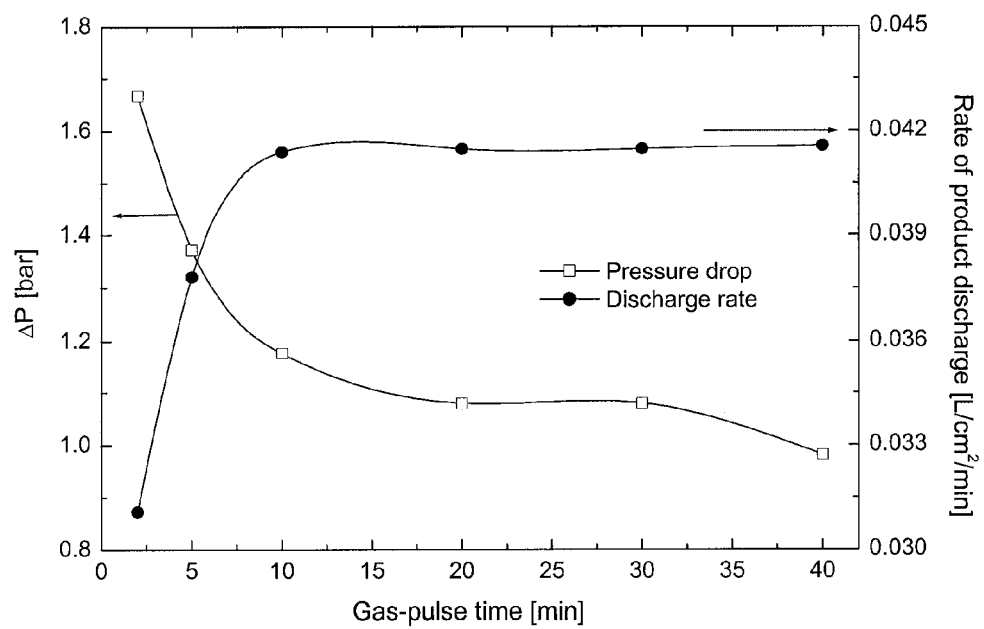
FIG. 6 illustrates pressure drops applied to a separation device and rates of product discharge according to a gas pulse time.

FIG. 6 illustrates pressure drops applied to a metal sintering filter and rates of product discharge according to a gas pulse time in a Fischer-Tropsch synthesis reactor.

The pressure drops applied to the metal sintering filter are decreased as the gas pulse time is increased to increase the rate of wax discharge. It can be seen that the rate of wax discharge reaches the highest value after 10 minutes and is constantly maintained thereafter.

Referring to FIGS. 5 and 6, the back-flushing of the metal sintering filter of the Fischer-Tropsch reactor having a diameter of 5 cm is optimized by performing the gas pulse for 10 minutes after 8 times of the solid catalyst/wax separations and discharges. The back-flushing is automatically performed by the level sensor 10, the differential pressure sensor 20, and the catalyst/wax separation device when 7 bar of pressure drop is detected at the upper and lower portions of the metal sintering filter, thereby continuously performing the Fischer-Tropsch reaction in optimized conditions.

Figure 7:
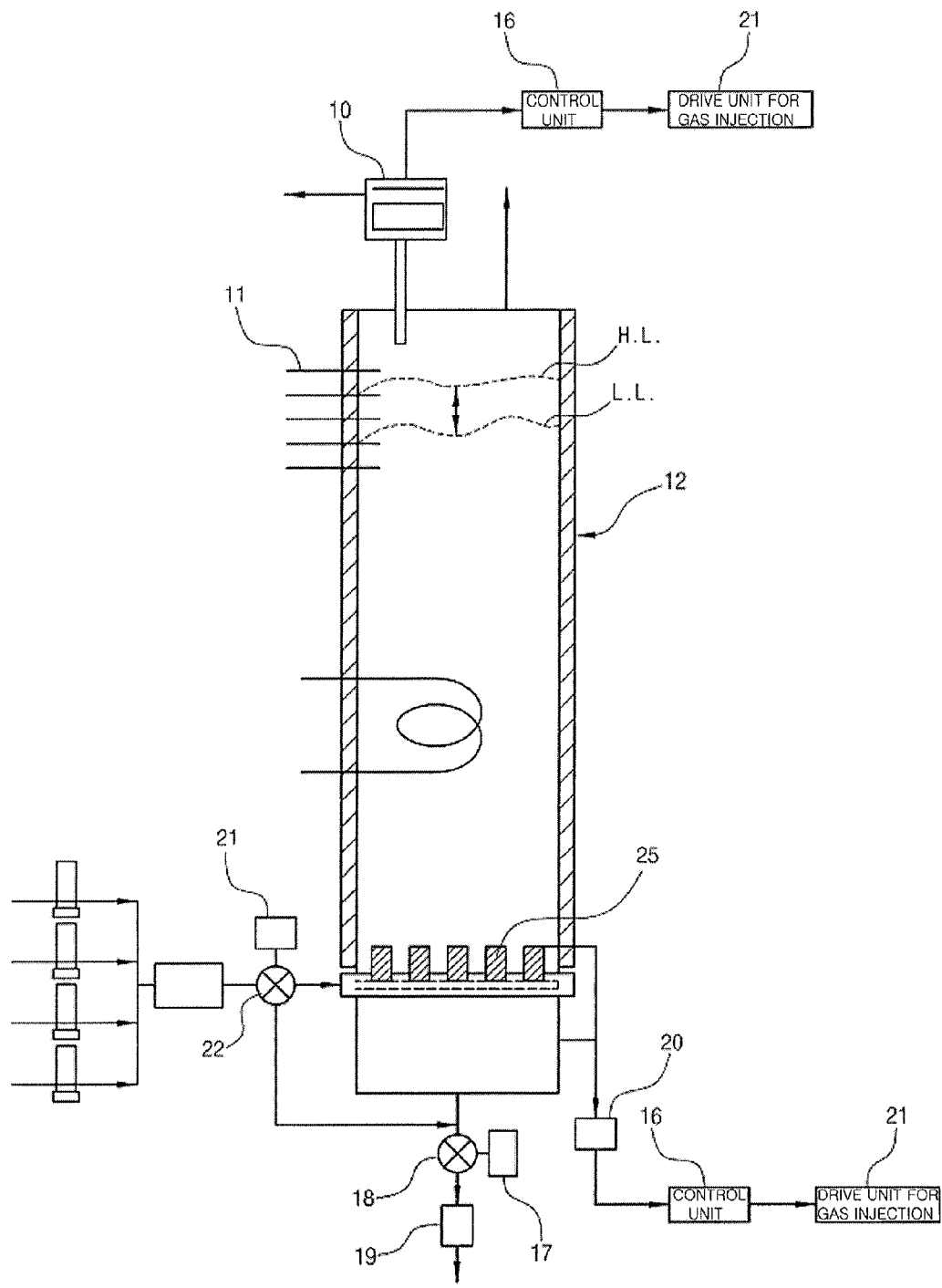
FIG. 7 schematically illustrates a bench scale Fischer-Tropsch synthesis reactor according to the present invention.

FIG. 7 schematically illustrates a bench scale (0.1 barrel/day) Fischer-Tropsch synthesis reactor 12 according to the present invention.

According to the present invention, a hydro-cyclone, as a solid catalyst/wax separation device, and a high-temperature and high-pressure slurry pump, as a slurry recirculation device, which are essential for a conventional slurry bubble column reactor for Fischer-Tropsch reactions, are not necessary. In addition, high-quality long-chain hydrocarbon products are continuously obtained while maintaining uniform operation conditions by discharging synthesized wax through the lower portion of the slurry bubble column reactor 12. Further, efficiency decrease of the FT reactor due to the abrasion of catalyst can be inhibited.

It will be apparent to those skilled in the art that various modifications and variations can be made in the present invention without departing from the spirit or scope of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A slurry bubble column reactor for continuous separation and discharge of solid catalysts and liquid products for Fischer-Tropsch synthesis reactions by which synthetic oil is synthesized from a feeding gas, the apparatus comprising:

a slurry-level sensing device which is installed at an inner portion of a reactor and detects the level of slurry-phase reactants, wherein the slurry-level sensing device comprises one of a radar or ultrasonic wave level sensor and a thermocouple, or both of the level sensors and the thermocouple, wherein the thermocouple detects the slurry-level of reactants by the temperature difference between the slurry-phase reactants and gas-phase space filled with tail gases;

a solid catalyst/liquid product separation device and a discharge device which are installed at a lower portion of the reactor and separate and discharge solid catalysts and liquid products mixed in the reactor;

a control unit which receives a signal from the slurry-level sensing device to open and close the discharge device, wherein the separation device filters the solid catalysts, and the discharge device continuously discharges the liquid products separated from the solid catalysts through the lower portion of the reactor based on the level of slurry-phase reactants detected by the slurry-level sensing device, wherein the solid catalysts are filtered by a metal sintering filter disposed at the lower portion of the slurry bubble column reactor, and wherein the metal sintering filter has a pore size of about 5 to about 15 μm and withstands high temperature and high pressure; and differential pressure sensors which are installed at upper and lower portions of the metal sintering filter and detect a pressure drop occurring at the upper and lower portions of the separation device, and a filter restoration device which provides periodic gas pulses to the separation device using a feeding gas to restore the separation device, to which the solid catalysts are fused or deposited, back-flushed to an initial state, wherein the control unit receives a signal from the differential pressure sensor to control operation of the filter restoration device when the pressure drop is increased to a predetermined level.

2. The slurry bubble column reactor for continuous separation and discharge of solid catalysts and products for Fischer-Tropsch synthesis reactions of claim 1, wherein the separation device is a filter for separating solid catalysts and liquid products having a uniform pore size.

3. The slurry bubble column reactor for continuous separation and discharge of solid catalysts and products for Fischer-Tropsch synthesis reactions of claim 2, wherein the separation device is a planar filter or a cartridge filter having a relatively larger separation area compared to the planar filter.

4. The slurry bubble column reactor for continuous separation and discharge of solid catalysts and products for Fischer-Tropsch synthesis reactions of claim 3, wherein the discharge device comprises an outlet disposed at a lower portion of the reactor, a product discharge fluid flow control valve, which opens and closes the outlet, and a drive unit controlling the opening and closing operations of the fluid flow control valve, wherein the drive unit is a motor or a cylinder.

5. The slurry bubble column reactor for continuous separation and discharge of solid catalysts and products for Fischer-Tropsch synthesis reactions of claim 1, wherein the filter restoration device comprises a gas distributor having a plurality of nozzles, a gas injection fluid flow control valve supplying the feeding gas to the gas distributor, and a drive unit controlling the opening and closing operations of the gas injection fluid flow control valve, for uniformly injecting the feeding gas into the reactor and not inhibiting the solid catalyst/product mixture from being injected into the separation device, wherein the drive unit is a motor or a cylinder.

6. The slurry bubble column reactor for continuous separation and discharge of solid catalysts and products for Fischer-Tropsch synthesis reactions of claim 5, wherein the gas distributor comprises a tubular cylinder in which a gas flows, wherein a plurality of rows of the tubular cylinder are arranged in parallel or the tubular cylinder radially extends from the center of the gas distributor.

* * * * *